Dec. 7, 1954  G. K. CZARNIKOW  2,696,052
RADAR BORESIGHT
Filed July 6, 1953  3 Sheets-Sheet 1
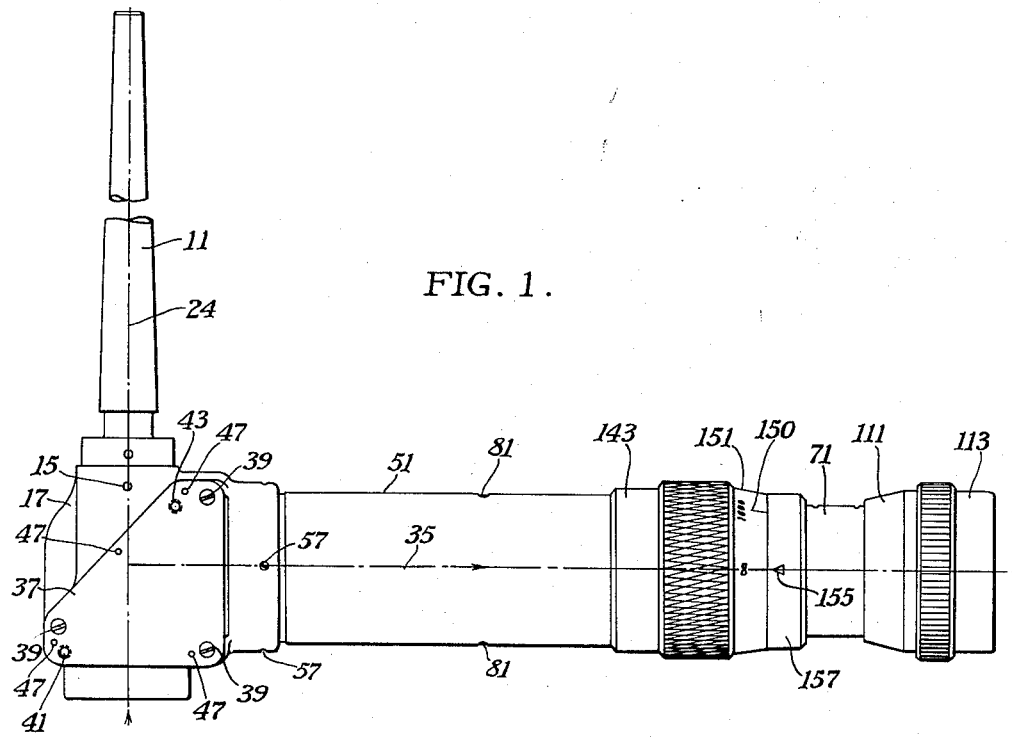
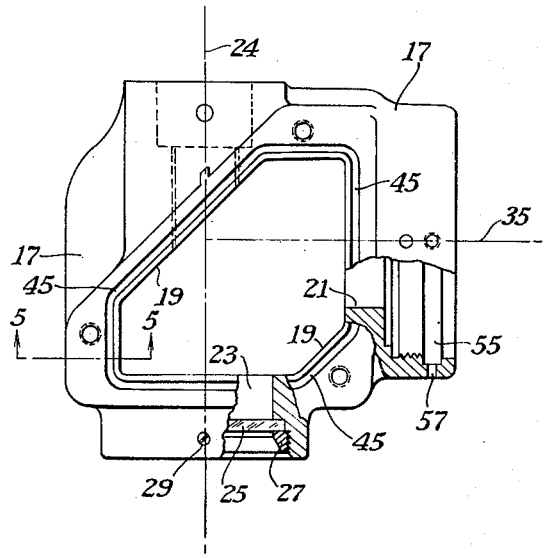
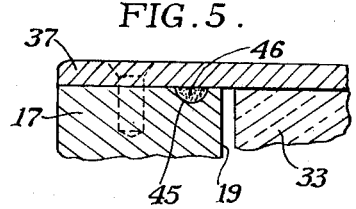
INVENTOR,
GEORGE K. CZARNIKOW
BY Charles Shepard
ATTORNEY

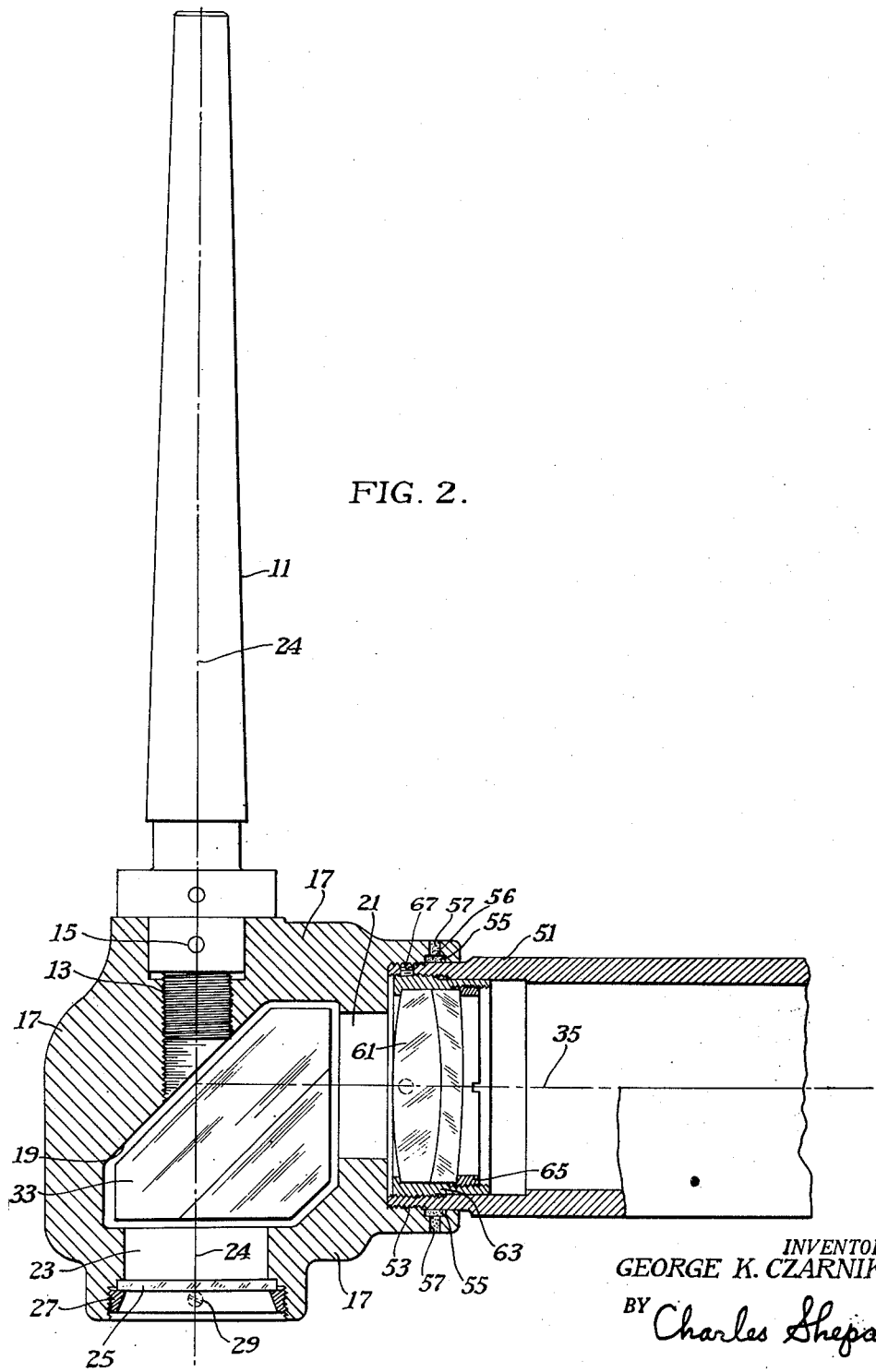

Dec. 7, 1954

G. K. CZARNIKOW 2,696,052

RADAR BORESIGHT

Filed July 6, 1953

INVENTOR,
GEORGE K. CZARNIKOW
BY Charles Shepard
ATTORNEY

United States Patent Office 2,696,052
Patented Dec. 7, 1954

2,696,052

RADAR BORESIGHT

George K. Czarnikow, Greece, N. Y., assignor to Wollensak Optical Company, Rochester, N. Y., a corporation of New York Application July 6, 1953, Serial No. 366,300

5 Claims. (Cl. 33—46)

This invention relates to a boresight especially adapted for use with a radar antenna, to aid in accurately alining the radar axis with the firing axis of guns or firearms controlled by or correlated with the radar antenna.

An object of the invention is the provision of a generally improved and more satisfactory boresight.

Another object is the provision of a boresight which can be manufactured economically and easily.

A further object is the provision of a boresight so designed and constructed as to enable easy adjustment and calibration of the parts during initial manufacturing assembly.

A still further object is the provision of a boresight having maximum reliability and accuracy, and so constructed as to minimize the chance of unauthorized tampering with the adjustments.

These and other desirable objects may be attained in the manner disclosed as an illustrative embodiment of the invention in the following description and in the accompanying drawings forming a part hereof, in which:

Fig. 1 is an elevation of a boresight in accordance with a preferred embodiment of the invention;

Fig. 2 is a longitudinal diametrical section through the left hand part of the foresight;

Fig. 4 is an elevation of the front face of the prism housing of the boresight, with the cover plate, the prism, and other parts removed; and Fig. 5 is a fragmentary sectional view taken substantially on the line 5—5 of Fig. 4.

The same reference numerals throughout the several views indicate the same parts.

Figure 3:
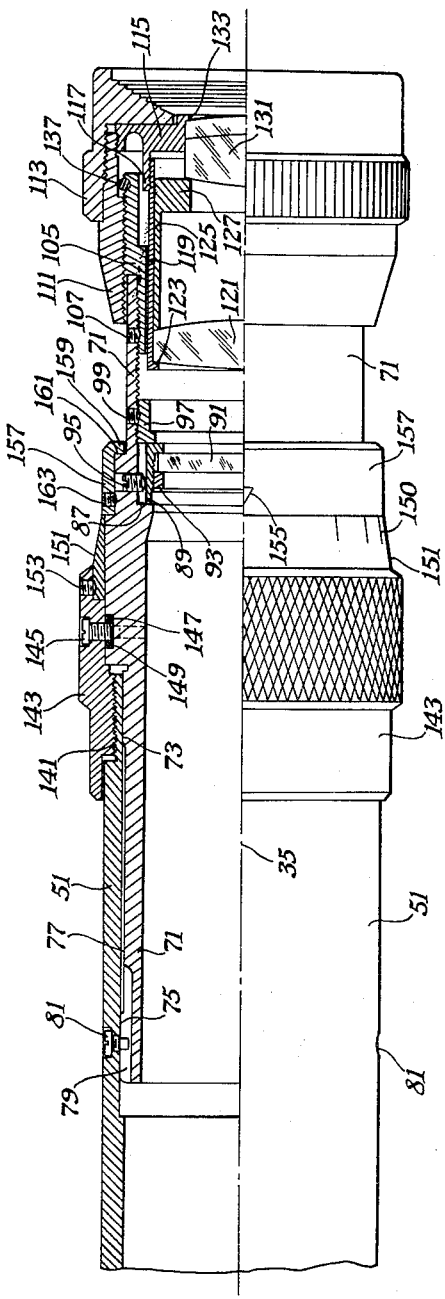
Fig. 3 is a similar section through the right hand part thereof, with portions in elevation, Fig. 3 constituting in effect a rightward continuation of the structure shown in Fig. 2.

Referring now to the drawings, the boresight comprises a long tapered shank 11 constituting a mandrel adapted to fit into a correspondingly tapered axial socket in the radar antenna. Supported from the shank 11, and fixed thereto by means such as the screw thread 13 and the tapered pin 15, is a prism housing indicated in general at 17. This prism housing has a prism-receiving cavity 19, a lateral opening 21, and a front opening 23 alined with the axis 24 of the tapered shank 11, this opening 23 being closed by a transparent sealing plate 25 held in place by a mounting ring 27 screwed into the housing 17 and held against turning by a set screw 29.

Mounted in the prism cavity 19 is a prism 33, of the type known as an Amici prism, which is one of the forms of roof prism, which produces a right angle or 90 degree deviation and simultaneously reverts and inverts the image. Thus light rays entering along the main optical axis 24 of the instrument through the window 25 will be deviated by the prism 33 so as to pass laterally out of the opening 21 along the auxiliary or lateral axis 35, and at the same time will be inverted and reverted by the roof of the Amici prism.

The prism 33 is mounted on the cover of the prism housing, and is adjusted by moving the entire cover relative to the prism housing. The cover plate 37 of suitable metal has an under surface which is fused to the upper surface of the prism 33. (Fig. 5.) The prism is, of course, placed on the cover plate in approximately the right position. For fine adjustment to obtain absolute optical accuracy, the cover plate 37 may be moved slightly relative to the prism housing 17. The cover plate is held to the housing by three screws 39, each passing through the cover plate through a hole larger than the screw, so that when the screws are loosened, the cover plate may be slightly moved or rotated in one direction or another. When the prism is placed at exactly the correct angle, the screws 39 are tightened, and the plate is dowel pinned to the housing. Then a plastic sealing compound is injected under high pressure through the openings 41 and 43 of the cover plate, so as to fill a sealing groove 45 formed in the upper surface of the housing 17 around the prism opening 19, the compound being shown at 46 in Fig. 5. As the sealing compound is forced in through the openings 41 and 43, under heavy pressure, it flows along the groove 45, since the cover 37 fits tightly over the top of this groove and prevents lateral escape of sealing compound. When the sealing compound is forced in, air escapes through the bleed holes 47. When the groove 45 has been completely filled with sealing compound, the cover 37 is thereby hermetically sealed to the housing 17, and the prism, being securely fixed to and supported from the cover, is permanently set in position within the housing. The holes drilled through the cover plate 37 and into the housing 17 are placed in locations offset from the sealing groove 45, so that the dowel pins will not intersect the groove 45 and will not interfere with flow of the sealing compound along the groove.

Associated with the lateral opening 21 of the housing is a telescope tube 51 having at its left end a male thread 53 screwed into a corresponding female thread in the housing 17. A sealing groove 55 formed in the housing 17 extends circumferentially around the tube 51, as shown, and is filled with the same plastic sealing compound above mentioned as shown at 56 in Fig. 2, forced in through holes 57 under high pressure so as to seal the telescope tube hermetically into the housing 17.

The telescope objective 61 (which may comprise two or more elements) is set in a mounting sleeve 63 and held against a shoulder at the left end of that sleeve by means of a mounting ring 65 screwed into the right end of the sleeve. The entire sleeve itself is screwed into the left end of the telescope tube 51 and, when screwed firmly into home position, is held against further movement by means of a radial set screw 67 which is tightened before the telescope tube 51 is screwed into and sealed in the housing 17. After the telescope tube has been screwed into and sealed in the housing, the housing covers the set screw 67, which is no longer accessible. Thus any accidental or unauthorized loosening of the objective is prevented, after completion of assembly.

Near the right hand end of the main telescope tube 51 there is a reticle tube 71 which projects rightwardly beyond the end of the tube 51 and also projects leftwardly for some distance into the tube 51. The tube 71 is provided with a shoulder 73 having a snug fitting bearing within and near the right end of the tube 51, and also is provided at its left end with another shoulder 75 likewise having a snug sliding bearing in the tube 51 near the middle thereof. Between these two shoulders 73 and 75 the tube 71 is relieved or of reduced external diameter as at 77, so that its sliding bearing within the tube 51 occurs only at the two spaced rings 73 and 75. A longitudinal groove 79 formed exteriorly on the reticle tube 71 near the left end thereof, snugly receives the inner cylindrical ends of a stud 81 screwed radially into a tapped opening in the main telescope tube 51. This stud 81 prevents the tube 71 from turning within the tube 51, while permitting the tube 71 to move longitudinally.

The tube 71 is formed with an internal shoulder 87 against which is mounted the reticle ring 89 containing the reticle 91 (of etched or ruled glass, for example) which is pressed rightwardly against a shoulder on the ring 89 by means of a mounting ring 93 screwed into the ring 89. The ring 89 is of smaller external diameter than the internal diameter of the tube 71 at the place where the reticle ring is located, so that it may be capable of limited adjusting movement in a plane perpendicular to the telescope axis 35. This adjustment is accomplished by four radial adjusting screws 95 threaded into tapped openings extending through the reticle tube 71 and having their inner ends abutting against the periphery of the reticle ring 89, the four screws 95 being arranged circumferentially of the tube 71 at intervals of 90 degrees to each other.

The prism 33 is adjusted (by moving the cover 37, before it is permanently sealed in place) until the auxiliary axis or telescope axis 35 is at exactly 90 degrees to the main optical axis 24 of the instrument, and the reticle 91 is adjusted by means of the adjusting screws 95 until the central referenec point of the reticle is exactly on the auxiliary axis or telescope axis 35. Then the reticle is held in this adjusted position not only by the screws 95 but also by the clamping ring 97 which is externally threaded to engage internal threads in the tube 71 and which is screwed tightly against the reticle ring 89 to press the latter tightly against the shoulder 87. Then the clamping ring 97, in turn, is held against turning by a set screw 99 screwed radially through the tube 71 and engaging the clamping ring 97.

The same internal screw threads of the tube 71 into which the clamping ring 97 is screwed, extend some distance righwardly from the clamping ring 97 and serve also to mate with screw threads on the extension sleeve 105 which projects rightwardly beyond the end of the reticle tube 71. This sleeve, after being assembled, is held against turning movement relative to the sleeve 71 by means of the set screw 107 extending radially through the tube 71 and engaging the sleeve 105. External screw threads on the sleeve 105 are engaged by internal threads on the eye piece focusing ring 111, the right end of which is externally threaded to receive the eye piece finishing ring 113 and internally threaded to receive external threads on the eye piece lens ring 115. The latter has a leftwardly extending flange 117 which is internally threaded to receive external threads at the right end of the lens tube 119. One of the eye piece lenses 121 is seated against a shoulder 123 at the left end of the tube 119. A spacer tube 125 presses leftwardly against the lens 121, and has at its right end a reduced diameter portion 127 pressing rightwardly against the other eye piece lens 131, which is seated rightwardly against a shoulder 133 formed on the ring 115. Thus the two eye piece lenses 121 and 131 are held firmly in position against movement relative to each other, but both of them may move as a unit, in an axial direction relative to the reticle 91, by turning the externally accessible eye piece parts 111 and 113 which are screwed tightly to each other. Turning these parts will advance the member 111 in one direction or the other along the sleeve 105, due to the rotatable screw threaded connection between the parts 105 and 111, and thus will carry the eye piece lenses axially relative to the reticle 91, so that the observer may focus the eye piece upon the reticle. A spring ring 137 at the right end of the sleeve 105 serves as a stop to prevent the eye piece from being unscrewed too far off of the sleeve 105.

For focusing the reticle itself relative to the objective 61, for different ranges, the main telescope tube 51 is provided at its right hand end with an external screw 141 which engages an internal thread of the reticle focusing ring 143. This ring has a radial screw 145 which extends through the ring and engages in a curved sector 147 which extends circumferentially for some distance in a circumferential groove 149 formed exteriorly in the reticle tube 71. By turning the reticel focusing ring 143 on the telescope tube 51, the focusing ring 143 will be moved axially in one direction or the other relative to the telescope tube 51. Through the circumferentially slidable connection 145, 147, 149, the axial movements of the ring 143 will be imparted to the tube 71 and will cause the reticle tube, along with the reticle, to move axially while the tube is accurately guided by engagement of the bearing surfaces 73 and 75 with the accurate interior surfaces of the telescope tube 51, and while the reticle tube is prevented from turning by the parts 79, 81. Thus the reticle 91 will be brought closer to or moved farther away from the objective 61, to focus for the range for which the boresight is to be set.

A focusing scale 150 is engraved on a tapered right hand end of a scale ring 151, the cylindrical left end of which fits snugly in a cylindrical cavity at the right end of the focusing ring 143, and which is held in any desired rotary position relative to the focusing ring 143 by means of a radial set screw 153 threaded through the focusing ring 143 and engaging the scale ring 151. The range scale or focusing scale engraved on this ring 151 cooperates with an index mark or zero mark 155 engraved on a ring 157 which extends snugly but rotatably around the reticle tube 71 in a position completely covering and obscuring the reticle adjusting screws 95. The right hand edge of the ring 157 has a shoulder 159 which engages snugly against a shoulder 161 on the reticle tube, and a radial set screw 163 threaded through the ring 157 engages the reticle tube 71 to prevent displacement of the ring 157.

The use of the separate rings 151 and 157 for carrying the focusing scale engravings, instead of placing the scales directly on the parts 143 and 71, has important advantages. In the manufacturing process, it is very difficult to start the mating screw threads of the parts 51 and 143 at any particular angle of orientation of these parts 51 and 143, and it is difficult, therefore, to engrave the focusing scale in proper relation of angular orientation to the screw threads on the focusing ring 143. By placing the focusing scale on a separate ring 151, the scale may be engraved in any desired orientation to the ring 151 without reference to the orientation of the internal screw threads of the ring 143, and then when the parts are assembled, the ring 151 bearing the scale engraving may be turned as desired relative to the focusing ring 143, until finally it is fixed in properly oriented position by tightening the set screw 153. Similarly, by placing the zero mark or index mark 155 on a separate ring 157, it is possible to change the angular adjustment of the ring 157 as desired in order to bring the zero mark around to any desired position circumferentially of the telescope, then tightening the ring and holding it in fixed position by tightening the set screw 163. Moreover, the fact that the index ring 157 covers the reticle adjusting screws 95 is important because it tends to prevent unauthorized tampering with the reticle adjustment, by persons who might otherwise be tempted to tamper with this adjustment if the adjusting screws were plainly visible and accessible.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A boresight comprising an elongated tapered mounting mandrel having a straight line axis, a prism housing mounted on said mandrel and having a prism cavity and a front window opening alined with said axis and a lateral window opening and a top opening, each of said openings extending from said cavity to the outside of said housing, a transparent plate extending across and sealing said front window opening, a cover plate extending across and sealing said top opening, an Amici prism mounted on and supported from said cover plate and lying within said cavity in position to receive light rays entering along said axis through said front window opening and to reflect such rays toward said lateral window opening, a telescope tube mounted on said axis in alinement with said lateral window, an objective mounting sleeve within said telescope tube, an objective mounted in said sleeve, a set screw extending radially through said telescope tube and engaging said sleeve, said prism housing having a portion overlying and covering said set screw when said telescope tube is assembled in normal position relative to said housing, a reticle tube mounted in said telescope tube for axial movement relative thereto, said reticle tube projecting beyond one end of said telescope tube which is remote from said prism housing, a focusing sleeve surrounding said remote end of said telescope tube and having screw threaded engagement therewith so that said focusing sleeve will move longitudinally relative to said telescope tube when it is turned thereon, a pin and slot connection between said telescope tube and said reticle tube to hold the latter against turning movement relative to the former while permitting the latter to move longitudinally relative to the former, a pin and slot connection between said reticle tube and said focusing sleeve to permit the latter to turn without turning the former and to impart longitudinal movements of the latter to the former, a reticle mount within said reticle tube, a plurality of reticle adjusting screws extending radially through said reticle tube and engaging said reticle mount, a focusing scale ring mounted on said focusing sleeve in adjustably rotative relation thereto, a set screw mounted on said focusing sleeve and engaging said scale ring to hold said scale ring, in fixed relation to said focusing sleeve, a scale index ring surrounding and adjustably rotatably mounted on said reticle tube in juxtaposition to said focusing scale ring and in covering relation to said reticle adjusting screws, a set screw for holding said index ring in fixed relation to said reticle tube, an internal screw thread within the end of said reticle tube which projects beyond said telescope tube, an extension sleeve having an external screw thread of one diameter threaded into said internal screw thread of said reticle tube and having an external screw thread of larger diameter extending beyond the end of said reticle tube, and an eyepiece assembly threadedly engaged with said external screw thread of larger diameter.

2. A construction as defined in claim 1, further including a plurality of clamping screws extending through holes in said cover plate and threaded into said prism housing, said holes being larger than the portions of said clamping screws which are within the holes so that said cover plate may have a limited range of movement in directions laterally of said clamping screws, a sealing groove formed in said prism housing in underlying relation to said cover plate and in encircling relation to said top opening, sealing compound inlet holes extending through said cover plate in alinement with said sealing groove, air bleed holes also extending through said cover plate in alinement with said sealing groove, and a sealing compound tightly filling said sealing groove and maintaining said cover plate in tightly sealed and immovable relation to said prism housing.

3. A boresight comprising a telescope tube, a reticle tube mounted in said telescope tube for axial movement relative thereto, said reticle tube projecting beyond one end of said telescope, a focusing sleeve surrounding said end of said telescope tube and having screw threaded engagement therewith so that said focusing sleeve will move longitudinally relative to said telescope tube when it is turned thereon, a pin and slot connection between said telescope tube and said reticle tube to hold the latter against turning movement relative to the former while permitting the latter to move longitudinally relative to the former, a pin and slot connection between said reticle tube and said focusing sleeve to permit the latter to turn without turning the former and to impart longitudinal movements of the latter to the former, a reticle mount within said reticle tube, a plurality of reticle adjusting screws extending radially through said reticle tube and engaging said reticle mount, a focusing scale ring mounted on said focusing sleeve in adjustably rotative relation thereto, a set screw mounted on said focusing sleeve and engaging said scale ring to hold said scale ring in fixed relation to said focusing sleeve, a scale index ring surrounding and adjustably rotatably mounted on said reticle tube in juxtaposition to said focusing scale ring and in covering relation to said reticle adjusting screws, and a set screw for holding said index ring in fixed relation to said reticle tube.

4. An optical instrument comprising a telescope tube, an objective mounted within said tube near one end thereof, a reticle tube mounted within said telescope tube near the opposite end thereof and projecting outwardly beyond said opposite end, said reticle tube having two ring-like bearing portions axially spaced from each other and fitting snugly and slidable within said telescope tube, said reticle tube being of reduced external diameter between said bearing portions so as to be substantially out of contact with said telescope tube between said bearing portions, a longitudinal groove in one of said tubes, a member fixed to the other of said tubes and engaging snugly and slidably in said groove to prevent said two tubes from turning relative to each other while permitting them to move longitudinally relative to each other, external screw threads on said telscope tube, a focusing sleeve having internal screw threads operatively engaged with said external threads and capable of rotation so that upon rotation it will travel longitudinally on said telescope tube, a circumferential groove formed externally in said reticle tube, an arcuate slide member engaging snugly and slidably in said circumferential groove to move circumferentially therein, a pin securing said circumferential slide member to said focusing sleeve so that movements of said sleeve are imparted to said slide member, a circumferentially graduated scale on said focusing sleeve, a plurality of reticle adjusting screws mounted on said reticle tube near said scale, a scale index ring surrounding said reticle tube in covering and hiding relation to said adjusting screws and lying adjacent to said scale on said focusing sleeve, and a scale index mark on said ring for cooperation with said graduated scale on said focusing sleeve.

5. A construction as defined in claim 4, in which said focusing sleeve includes two parts, a first part carrying said internal screw threads and said pin, and a second part carrying said circumferentially graduated scale, said second part having non-threaded engagement with said first part and being rotatably adjustable relative to said first part, and a screw threaded holding member for holding said second part in any desired position of rotary adjustment relative to said first part.

References Cited in the file of this patent

UNITED STATES PATENTS

| Number | Name | Date |
|---|---|---|
| 964,703 | Smith | July 19, 1910 |
| 1,170,579 | Troppman | Feb. 8, 1916 |
| 2,155,389 | Arden | Apr. 25, 1939 |
| 2,184,351 | Langsner | Dec. 26, 1939 |
| 2,288,619 | Gardner | July 7, 1942 |
| 2,351,747 | Eckert | June 20, 1944 |
| 2,353,272 | Simmons et al. | July 11, 1944 |